US010829133B2

(12) United States Patent
Kienreich

(10) Patent No.: US 10,829,133 B2
(45) Date of Patent: Nov. 10, 2020

(54) DEVICE COMPRISING A RUNNING ROLLER AND A SUSPENSION SYSTEM FOR A RUNNING ROLLER

(71) Applicant: Faigle Kunststoffe GmbH, Hard (AT)

(72) Inventor: Tobias Kienreich, Horbranz (AT)

(73) Assignee: Faigle Kunststoffe GmbH, Hard (AT)

( * ) Notice: Subject to any disclaimer, the term of this patent is extended or adjusted under 35 U.S.C. 154(b) by 0 days.

(21) Appl. No.: 16/451,634

(22) Filed: Jun. 25, 2019

(65) Prior Publication Data
US 2020/0010099 A1 Jan. 9, 2020

(30) Foreign Application Priority Data

Jul. 5, 2018 (AT) .................................. A 199/2018

(51) Int. Cl.
*B61F 5/26* (2006.01)

(52) U.S. Cl.
CPC ....................................... *B61F 5/26* (2013.01)

(58) Field of Classification Search
CPC ..... B61F 5/26; B60B 33/001; B60B 33/0047; Y10T 16/196; Y10T 16/364
See application file for complete search history.

(56) References Cited

U.S. PATENT DOCUMENTS

| | | | | |
|---|---|---|---|---|
| 5,355,664 A * | 10/1994 | Zenner | ................... | A01D 34/82 16/35 D |
| 5,448,796 A * | 9/1995 | Larson | ................. | B60B 33/045 16/44 |
| 5,950,279 A * | 9/1999 | Chaput | .................... | A47H 1/08 16/105 |
| 6,357,077 B1 * | 3/2002 | Jones, Jr. | .............. | B60B 33/045 16/35 D |
| 6,499,184 B2 * | 12/2002 | Plate | ..................... | B60B 33/045 16/18 R |
| 6,748,623 B1 * | 6/2004 | Tsai | ......................... | B60B 7/02 16/35 D |
| 6,823,560 B2 * | 11/2004 | Lin | ....................... | B60B 33/045 16/44 |
| 6,880,833 B2 * | 4/2005 | Polanco | .............. | A43B 5/1641 280/11.221 |

(Continued)

FOREIGN PATENT DOCUMENTS

| | | |
|---|---|---|
| WO | 2008137847 | 11/2008 |
| WO | 2011078468 | 6/2011 |
| WO | 2015121786 | 8/2015 |

*Primary Examiner* — Victor D Batson
*Assistant Examiner* — Matthew J Sullivan
(74) *Attorney, Agent, or Firm* — Volpe Koenig

(57) ABSTRACT

A device including a running roller (2) which can be rotated about a rotational axis (10), for a conveyor system, and a suspension system which supports the running roller (2) and has a fork (6) and an axle pin (7) which penetrates the running roller (2) and is supported by the fork (6). The suspension system has, furthermore, a first and a second clip part (8) which have in each case a recess (8*a*), into which a respective one of the end sections (7*a*, 7*b*) of the axle pin (7) protrudes The first and a second clip parts (8), for connection to the fork (6), can be pushed in each case in a push-in direction (13) which lies at a right angle with respect to the rotational axis (10) into a respective push-in track (6*d*) of the fork (6) and can be snapped together with the fork (6).

10 Claims, 5 Drawing Sheets

(56) References Cited

U.S. PATENT DOCUMENTS

| | | | | | |
|---|---|---|---|---|---|
| 7,093,319 | B2* | 8/2006 | Lemeur, Jr. | ............ | B60B 33/045 16/105 |
| 7,849,560 | B2* | 12/2010 | Kelley | .................. | E05D 15/066 16/105 |
| 8,141,331 | B2* | 3/2012 | Bich | ...................... | A01D 63/04 56/15.2 |
| 8,210,550 | B2* | 7/2012 | White | ...................... | B62B 9/18 16/18 R |
| 8,413,295 | B2* | 4/2013 | Campbell | ............. | B60B 33/045 16/29 |
| 8,628,098 | B2* | 1/2014 | Ruppert | .................. | B60B 33/04 280/86 |
| 8,807,580 | B2* | 8/2014 | Ruppert | .............. | B60B 33/0049 280/86 |
| 8,955,195 | B2* | 2/2015 | Chang | ................ | E05D 15/0639 16/91 |
| 9,611,684 | B2* | 4/2017 | Zimmer | ................ | E06B 3/4636 |
| 10,052,910 | B2* | 8/2018 | Moore | .................... | H02K 11/042 |
| 10,392,192 | B2* | 8/2019 | Gabor | ................... | B65G 17/40 |
| 2004/0068831 | A1* | 4/2004 | Caruso | ............... | B60B 33/0021 16/18 R |
| 2014/0041433 | A1* | 2/2014 | St. Pierre | .................. | F16C 9/02 72/252.5 |

* cited by examiner

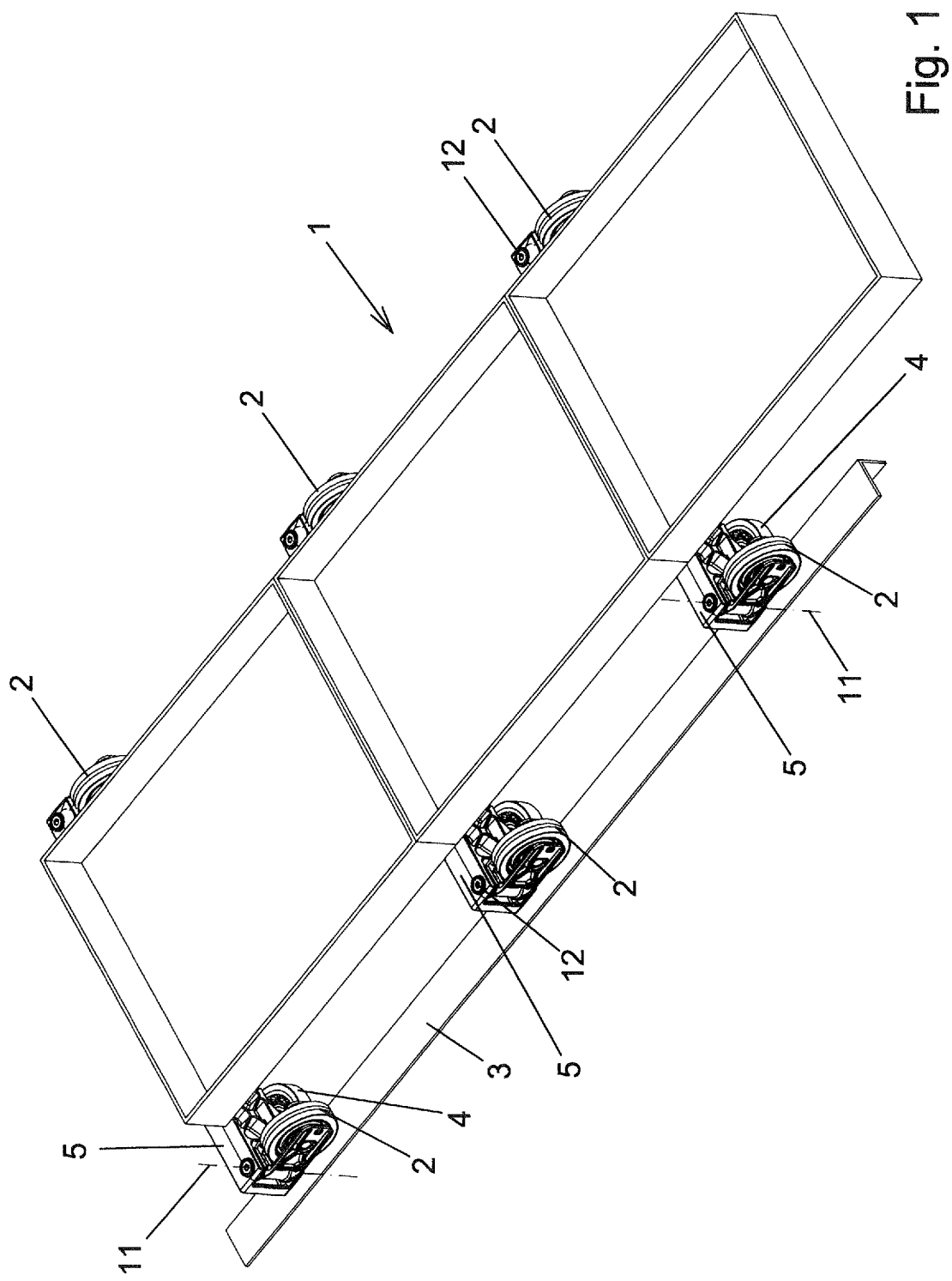

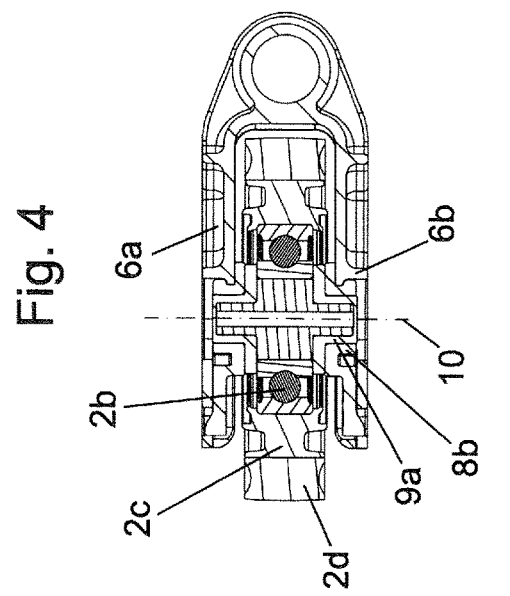
Fig. 4
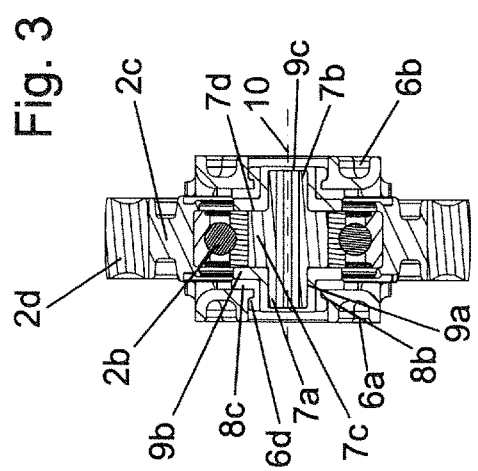
Fig. 3
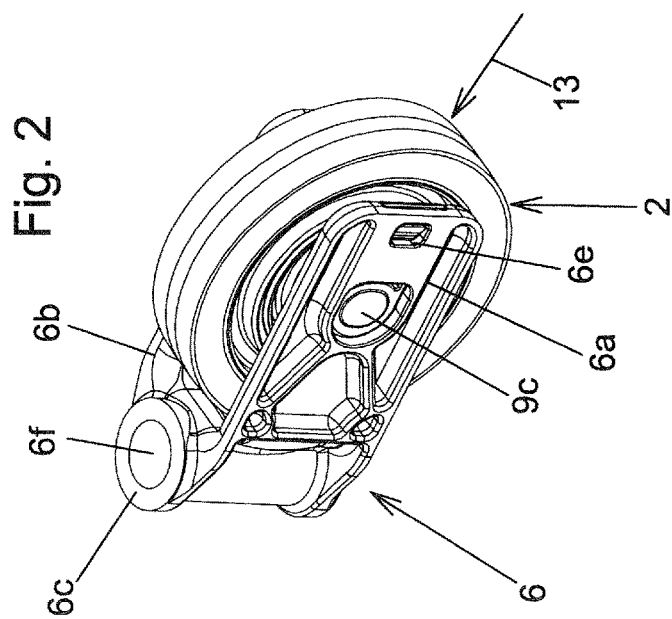
Fig. 2
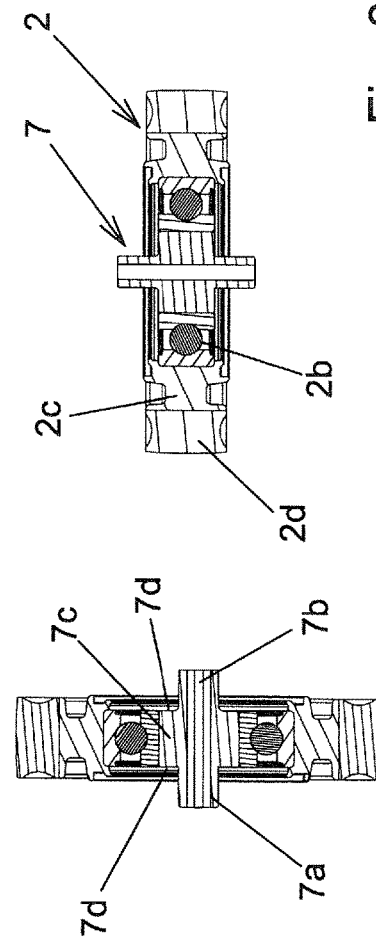
Fig. 8
Fig. 7
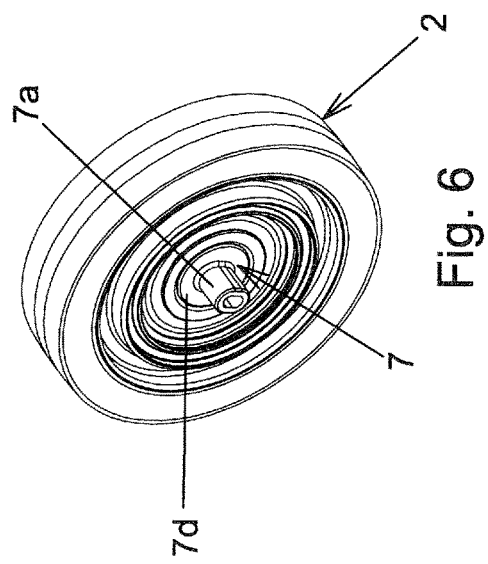
Fig. 6

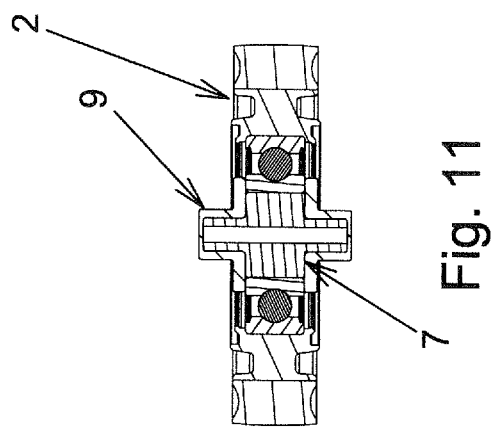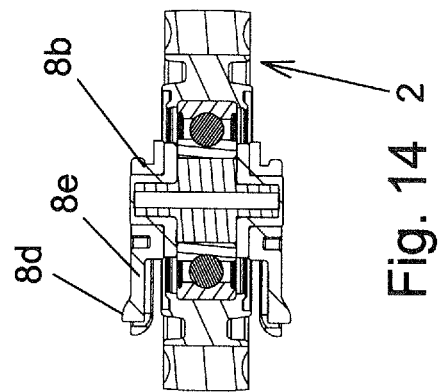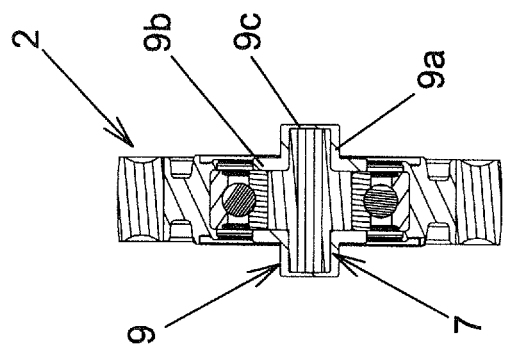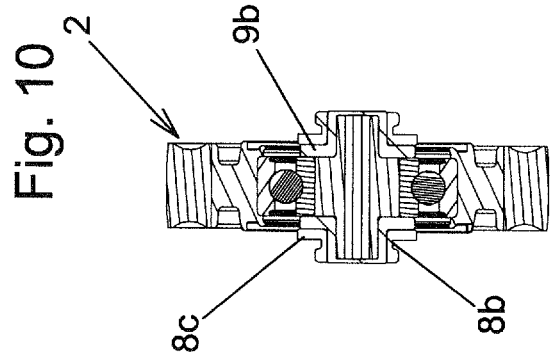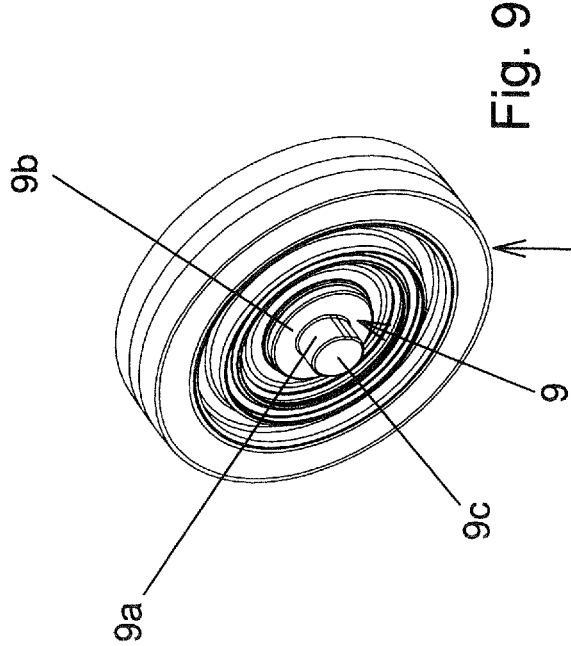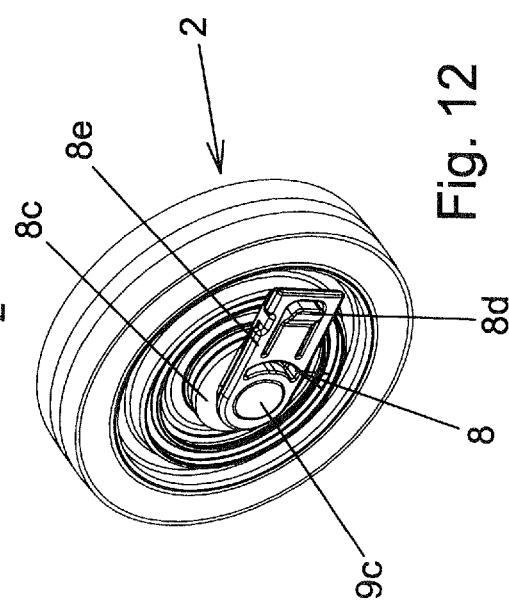

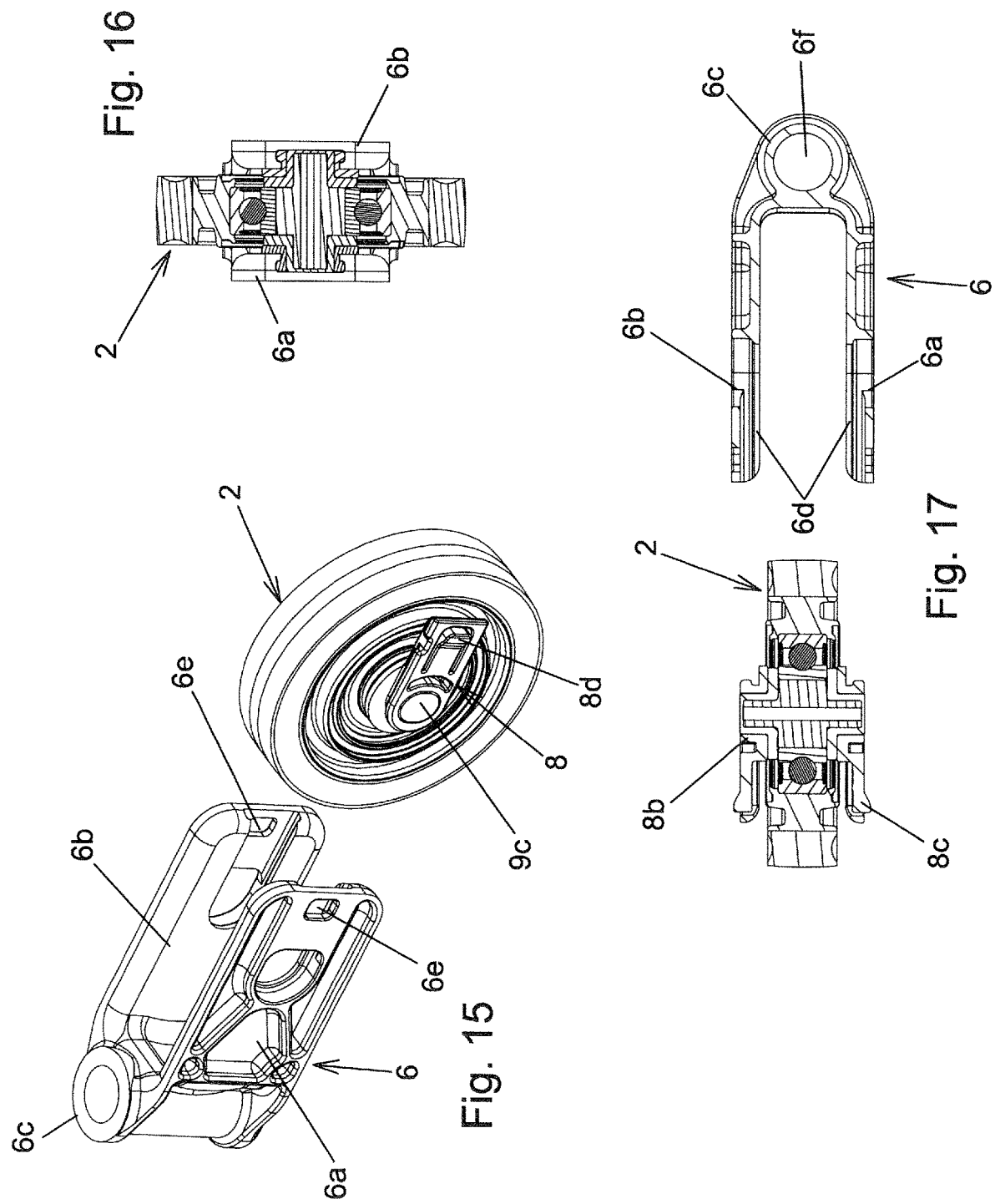

DEVICE COMPRISING A RUNNING ROLLER AND A SUSPENSION SYSTEM FOR A RUNNING ROLLER

INCORPORATION BY REFERENCE

The following documents are incorporated herein by reference as if fully set forth: Austrian Patent Application No. A199/2018, filed Jul. 5, 2019.

BACKGROUND

The invention relates to a device comprising a running roller which can be rotated about a rotational axis for a conveyor system, and to a suspension system which supports the running roller and has a fork and an axle pin which penetrates the roller and is supported by the fork.

Running rollers for conveyor systems are used, in particular, in transport trolleys for rack stores for piece goods. Floor-bound, rail-guided transport trolleys of this type are also called a shuttle or transfer trolley. A fork which consists of metal and receives the running roller between its fork arms conventionally serves for the suspension of a running roller of this type. An axle pin which is made from metal and configures the rotational axis of the running roller penetrates the running roller and openings of the fork arms, and is connected rigidly to the fork arms, for example by way of screw connections or by way of pressing.

It is an object of the invention to provide an advantageous device of the type mentioned at the outset which can be assembled simply and preferably without tools. This takes place using one or more features of the invention.

In the case of the device according to the invention, a first and a second clip part are provided. The clip parts have in each case a recess, into which in each case one of the end sections of the axle pin protrudes. For connection to the fork, the clip parts can be pushed in each case in a push-in direction which lies at a right angle with respect to the rotational axis of the running roller into a respective push-in track of the fork and can be snapped together with the fork.

The assembly of the running roller on the suspension system can therefore advantageously take place simply by way of plugging together and latching of the parts, without a special assembly tool being required. Simple dismantling of the running roller from the suspension system is advantageously also possible, for example in order to replace the running roller, by the snap-action connections between the clip parts and the fork being released.

In one advantageous embodiment, the snap-action connection between the respective clip part and the fork is configured by way of an elastically flexible latching lug of the clip part, which latching lug snaps into a latching recess of the fork. An arrangement of the latching lug on the respective fork arm of the fork and the latching recess on the respective clip part is also conceivable and possible, however.

The push-in tracks favorably lie on those inner sides of the fork arms which face the running roller, and run in the longitudinal direction of the fork arms. Here, the longitudinal direction of a respective fork arm is defined by way of its course from its free end in the direction of that base section of the fork which connects the two fork arms.

One preferred embodiment of the invention provides that in each case a damping part is arranged between the respective clip part and the respective end section of the axle pin. Here, the material of the damping part has a greater elasticity than that of the axle pin and the fork. In particular, a sleeve-shaped section of the damping part surrounds the axle pin, and said sleeve-shaped section of the damping part is surrounded by a sleeve-shaped section of the clip part.

The damping part advantageously acts not only in the radial direction, but rather also in the axial direction. To this end, the respective damping part can have an annular collar which projects to the outside from the sleeve-shaped section at one end of the latter. This annular collar bears against a shoulder of the axle pin, which shoulder is configured between a middle section of the axle pin and a respective end section of the axle pin, which end section has a smaller diameter in comparison with the middle section. The associated clip part bears against the annular collar on the other side of the annular collar.

In the case of the device according to the invention, the fork and the clip parts, preferably also the axle pin, advantageously consist of plastic. It is particularly preferred that all parts of the suspension system consist of plastic.

BRIEF DESCRIPTION OF THE DRAWINGS

Further advantages and details of the invention will be described in the following text using the appended drawing, in which:

FIG. 1 shows a transport trolley of a conveyor system having running rollers which are suspended in the way according to the invention, FIG. 2 shows a perspective view of a device according to the invention, FIGS. 3 and 4 show a vertical section and a horizontal section through the rotational axis, FIGS. 6 to 8 show illustrations in accordance with FIGS. 2 to 4 of the running roller with the axle pin which is plugged in, FIGS. 9 to 11 show illustrations in accordance with FIGS. 2 to 4 with damping parts which are additionally plugged on, FIGS. 12 to 14 show illustrations in accordance with FIGS. 2 to 4 with clip parts which are additionally plugged on, and FIGS. 15 to 17 show illustrations in accordance with FIGS. 2 to 4, additionally with the fork, in the position, in which the clip parts can be pushed into the push-in tracks of the fork.

DETAILED DESCRIPTION

Figure 5:
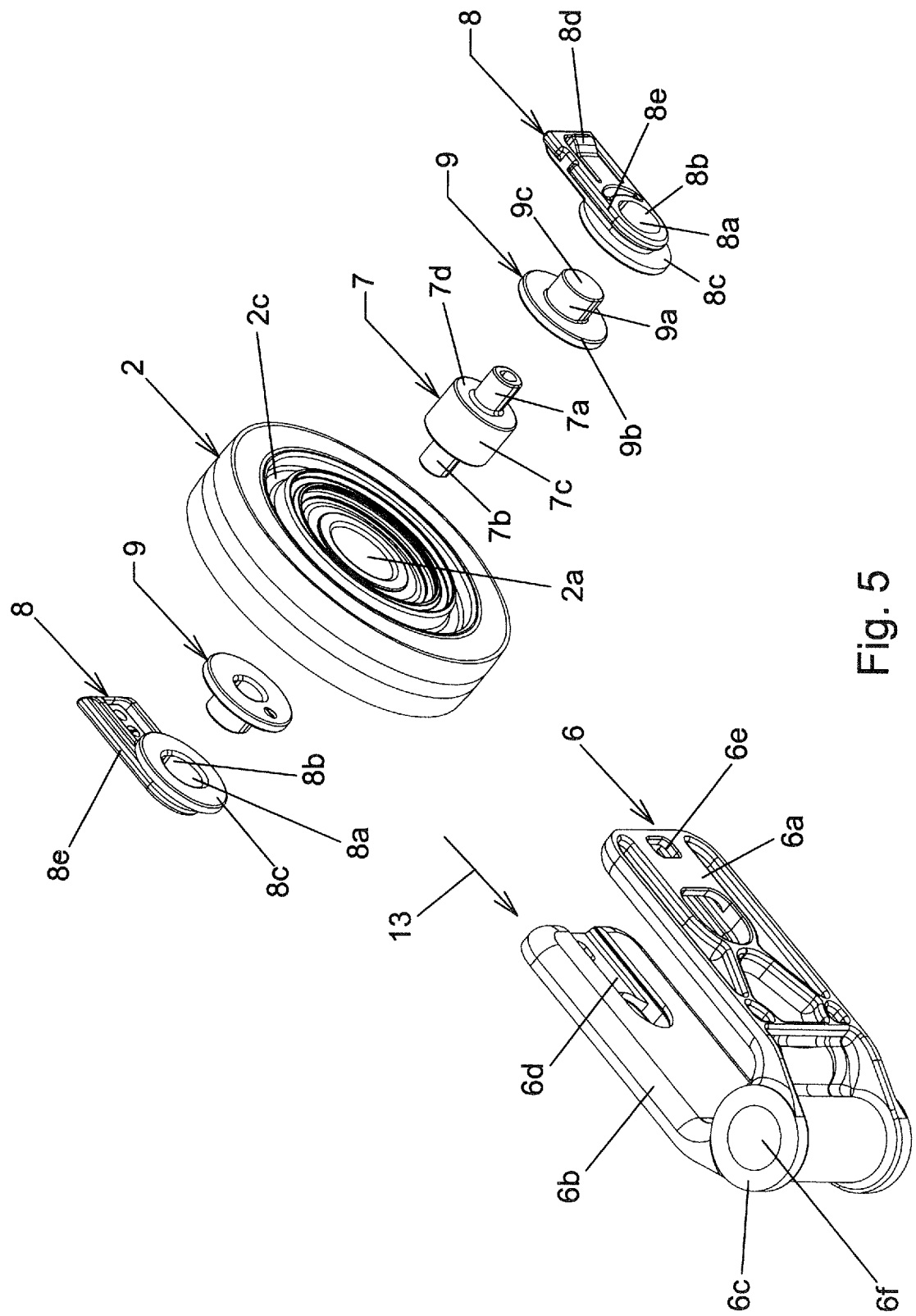
FIG. 5 shows an exploded illustration.

One exemplary embodiment of the invention will be described in the following text using FIGS. 1 to 17.

FIG. 1 shows a transport trolley 1 which is fitted with running rollers 2 which are suspended in a way according to the invention. The running rollers 2 run on running tracks which are formed by rails 3. The orientation of the running rollers 2 with respect to the rails 3 is brought about by guide rollers 4 which interact with guide faces which are arranged laterally on the rails 3, as is known.

The running rollers 2 are connected by the suspension system to frame parts 5.

The suspension system for a respective running roller 2 has a fork 6 which has a first and a second fork arm 6a, 6b, which are connected to one another by way of a base section 6c of the fork.

The running roller 2 is held in the intermediate space between the fork arms 6a, 6b by way of an axle pin 7 which is arranged in a central opening 2a of the running roller 2, the axle pin 7 being connected to the fork arms 6a, 6b in the way which is described in the further text.

In the exemplary embodiment, the opening 2a is configured by the inner ring of a ball bearing 2b of the running roller, on the outer ring of which ball bearing 2b the rim 2c is arranged, on which in turn the tread 2d is arranged on the outside.

The tread 2d represents a solid rubber tire of the running roller 2.

The longitudinal center axis of the axle pin 7 therefore represents the rotational axis 10, about which the running roller 2 can be rotated.

The axle pin 7 has first and second end sections 7a, 7b which protrude into recesses 8a of clip parts 8, a respective damping part 9 lying between the respective end section 7a, 7b and the respective clip part 8. Here, a respective damping part 9 has a sleeve-shaped section 9a, by way of which it surrounds the respective end section 7a of the axle pin 7 and which is received in a sleeve-shaped section 8b of the respective clip part.

The axle pin 7b advantageously has a middle section 7c which has a greater diameter in comparison with the end sections 7a, 7b and on which the running roller (in the exemplary embodiment, by way of the inner ring of its ball bearing 2b) is arranged. An annular collar 9b of the respective damping part 9 bears against the respective shoulder 7d between the middle section 7c and the respective end section 7a, 7b. The annular collar 9b represents a disk-shaped section of the damping part 9, which disk-shaped section protrudes to the outside from that edge of the sleeve-shaped section 9a of the damping part 9 which faces the running roller 2. An annular collar 8c likewise projects to the outside at that end of the sleeve-shaped section 8b of the respective clip part 8 which faces the running roller 2, which annular collar 8c forms a disk-shaped section of the clip part 8 and bears against that side of the annular collar 9b of the damping part 9 which faces away from the running roller 2. A respective damping part 9 therefore acts not only in the radial direction, but rather also in the axial direction.

The fork arms 6a, 6b of the fork 6 have in each case one push-in track 6d. The latter receives the respective clip part 8, the clip part 8 being secured against a displacement in the longitudinal direction of the push-in track 6d by way of a latching lug 8d which engages into a latching recess 6e of the fork 6.

The push-in track 6d which is arranged on that inner side of the respective fork arm 6a, 6b which faces the running roller 2 runs in the longitudinal direction of the respective fork arm. A respective clip part 8 is guided displaceably with respect to the push-in track 6d by way of a guide section 8e which adjoins the sleeve-shaped section 8b of the clip part 8.

The guide section 8e has a longitudinal extent which lies parallel to the longitudinal extent of the push-in track 6d.

The push-in track 6d is formed by a groove-shaped depression of the fork arm 6a, 6b. Said groove-shaped depression can advantageously have undercut side walls, with the result that the guide section 8e is secured against falling out of the push-in track 6d in all directions at a right angle with respect to the push-in direction 13. To this end, the guide section 8e engages into the undercut region of the push-in track 6d.

The latching lug 8d is arranged on the guide section 8e, to be precise in a region which is remote from the connecting region of the guide section 8e to the sleeve-shaped section 8b.

In the exemplary embodiment, the damping parts 9 have end caps 9c which close the sleeve-shaped sections 9a on the opposite side of the annular collar 9b.

For assembly of the running roller 2 with the suspension system which mounts the running roller 2 rotatably, the axle pin 7 is first of all plugged into the opening 2a of the running roller 2 (in the direction parallel to the rotational axis 10). This state can be seen in FIGS. 6 to 8.

Furthermore, the damping parts 9 are plugged onto the end sections 7a, 7b of the axle pin 7 (in the direction parallel to the rotational axis 10). This state is shown in FIGS. 9 to 11.

Furthermore, the clip parts 8 are plugged onto the damping parts 9 (in the direction parallel to the rotational axis 10). In this way, the sleeve-shaped sections 8b of the clip parts 8 surround the sleeve-shaped sections 9a of the damping parts 9, which sleeve-shaped sections 9a in turn surround the axle pin 7. Furthermore, the annular collar 9b of the respective damping part 9 bears against the respective shoulder 7d of the axle pin 7, and the annular collar 8c of the respective clip part 8 bears against the annular collar 9b of the respective damping part 9 on the opposite side. This state is shown in FIGS. 12 to 14.

The running roller with the plugged-in axle pin 7 and the plugged-on damping parts 9 and clip parts 8 is then positioned in front of the intermediate space between the fork arms 6a, 6b, as is shown in FIGS. 15 to 17. Furthermore, the running roller is pushed into the intermediate space between the fork arms 6a, 6b, the clip parts 8 being pushed with their guide sections 8e in the push-in direction 13 into the push-in tracks 6d, until the latching lugs 8d of the clip parts 8 snap into the latching recesses 6e of the fork arms 6a, 6b. The push-in direction 13 lies at a right angle with respect to the rotational axis 10.

The push-in direction 13 advantageously lies parallel to the direction of the longitudinal extent (=longitudinal direction) of the fork arms 6a, 6b. The push-in direction 13 therefore lies at a right angle with respect to the pivot axis 11. In this way, the state which is shown in FIGS. 2 to 4 is reached.

In the exemplary embodiment, the latching recesses 6e are configured in the form of window openings in the fork arms 6a, 6b. If the running roller 2 is to be dismantled again from the suspension system, the latching lugs 8d can be pressed through said window openings, until they pass out of engagement with the latching recesses 6e, whereupon the clip parts 8 can be pulled off from the fork arms 6a, 6b along the push-in tracks 6d.

Instead of window openings, the latching recesses 6e might also be configured in the form of depressions, it then being possible for the guide sections 8e to be pressed together in order to bring the latching lugs 8d out of engagement with the latching recesses 6e.

In the exemplary embodiment, the fork 6 can be pivoted about a vertical pivot axis 11 with respect to the frame part 5, on which it is held. To this end, the base section 6c has a through opening 6f which is penetrated by a joint pin 12 which is fastened to the frame part 5.

The fork 6 preferably consists of plastic, for example PA. The plastic favorably contains carbon fibers. As a result, a static charge is counteracted. A content of other electrically conductive fibers or particles and/or an electrically conducting coating might also be provided.

The clip parts 8 preferably consist of plastic, for example PA. The plastic favorably contains carbon fibers. As a result, a static charge is counteracted. A content of other electrically conductive fibers or particles and/or an electrically conducting coating might also be provided.

The axle pin preferably consists of plastic, for example PA. The plastic favorably contains carbon fibers. As a result, a static charge is counteracted. A content of other electrically conductive fibers or particles and/or an electrically conducting coating might also be provided.

The damping parts 9 preferably consist of a thermoplastic elastomer (TPE), for example PU. A construction from another elastomeric material is likewise conceivable and possible.

Smooth, low-vibration running is achieved by way of the damping parts 9 which are connected between the axle pin and the clip parts 8. It is also fundamentally conceivable and possible to omit the damping parts 9. The clip parts 8 are then plugged directly onto the end sections 7a, 7b of the axle pin 7, and the end sections 7a, 7b of the axle pin 7 are held by the clip parts 8 directly (and not with the damping parts 9 being connected in between).

A configuration is also conceivable and possible with push-in tracks which extend at a right angle with respect to the longitudinal direction of the fork arms 6a, 6b, that is to say the push-in direction 13 lies at a right angle with respect to the direction of the longitudinal extent of the fork arms 6a, 6b.

Costs for the manufacture and/or assembly can be saved by way of the invention.

The device according to the invention is also distinguished by a low weight.

As described, the invention can be used, in particular, in the case of floor-bound, rail-guided transport trolleys of conveyor systems for rack stores for piece goods. A use in conjunction with other running rollers, in particular those with solid rubber tires, is also conceivable and possible, however.

LIST OF DESIGNATIONS

1 Transport trolley
2 Running roller
2a Opening
2b Ball bearing
2c Rim
2d Tread
3 Rail
4 Guide roller
5 Frame part
6 Fork
6a Fork arm
6b Fork arm
6c Base section
6d Push-in track
6e Latching recess
6f Through opening
7 Axle pin
7a End section
7b End section
7c Middle section
7d Shoulder
8 Clip part
8a Recess
8b Sleeve-shaped section
8c Annular collar
8d Latching lug
8e Guide section
9 Damping part
9a Sleeve-shaped section
9b Annular collar
9c End cap
10 Rotational axis
11 Pivot axis
12 Joint pin
13 Push-in direction

The invention claimed is:

1. A device comprising:
a running roller that is rotatable about a rotational axis, for a conveyor system; and
a suspension system that supports the running roller and includes:
a fork having first and second fork arms, each including a respective push-in track,
an axle pin which penetrates the running roller and is supported by the fork, the axle pin having first and second end sections,
a first clip part and a second clip part, each having a recess, into which a respective one of the first and second end sections of the axle pin protrudes, and each of which, for connection to the fork, are pushed in a push-in direction which lies at a right angle with respect to the rotational axis into a respective one of the push-in tracks of the fork and are snapped together with the fork.

2. The device as claimed in claim 1, wherein the push-in tracks are arranged on the inner sides, facing the running roller, of the fork arms of the fork (6) which lie on both sides of the running roller.

3. The device as claimed in claim 1, wherein the push-in tracks extend in a longitudinal direction of the fork arms.

4. The device as claimed in claim 1, wherein the fork arms are connected to one another by a base section which has a through opening for that is adapted to receive a joint pin.

5. The device as claimed in claim 1, further comprising a respective damping part arranged between each of the respective first and second clip parts and the respective end sections of the axle pin.

6. The device as claimed in claim 5, wherein the damping part includes a sleeve-shaped section that surrounds the axle pin and is surrounded by a sleeve-shaped section of the clip part.

7. The device as claimed in claim 6, wherein the end sections of the axle pin have a smaller diameter than a middle section of the axle pin, and an annular collar of the damping part, said annular collar projecting from the sleeve-shaped section of the respective damping part, bears against a respective shoulder between a middle section and the respective end section of the axle pin.

8. The device as claimed in claim 6, wherein the sleeve-shaped section of a respective clip part is adjoined by a guide section which is guided displaceably by the respective push-in track of the fork.

9. The device as claimed in claim 1, wherein the fork and the clip parts are formed of plastic.

10. The device as claimed in claim 1, wherein the axle pin is formed of plastic.

* * * * *